United States Patent
Grimen et al.

(10) Patent No.: US 8,627,081 B2
(45) Date of Patent: Jan. 7, 2014

(54) MULTIMEDIA DATA PROTECTION

(75) Inventors: Gisle Grimen, Trondheim (NO);
Christian Mönch, Trondheim (NO)

(73) Assignee: Conax AS, Oslo (NO)

( * ) Notice: Subject to any disclaimer, the term of this patent is extended or adjusted under 35 U.S.C. 154(b) by 1020 days.

(21) Appl. No.: 11/995,677

(22) PCT Filed: Jul. 14, 2006

(86) PCT No.: PCT/GB2006/002619
§ 371 (c)(1),
(2), (4) Date: Aug. 7, 2008

(87) PCT Pub. No.: WO2007/007112
PCT Pub. Date: Jan. 18, 2007

(65) Prior Publication Data
US 2009/0132823 A1    May 21, 2009

(30) Foreign Application Priority Data
Jul. 14, 2005    (GB) .................................. 0514492.8

(51) Int. Cl.
*H04L 9/00*    (2006.01)
*H04N 7/16*    (2011.01)
*H04N 5/00*    (2011.01)

(52) U.S. Cl.
USPC ............................ 713/171; 713/168; 725/105

(58) Field of Classification Search
USPC ........................................................ 713/187
See application file for complete search history.

(56) References Cited

U.S. PATENT DOCUMENTS 6,185,685 B1 *   2/2001   Morgan et al. ................. 713/183
6,880,149 B2 *   4/2005   Cronce .......................... 717/126
(Continued)

FOREIGN PATENT DOCUMENTS

EP     1 187 483 A2     3/2002
EP     1 246 463 A      10/2002
(Continued)

OTHER PUBLICATIONS

Chang et al., "Protecting software code by guards", *Lecture Notes in Computer Science* (2002), 2320(10):160-175.

(Continued)

*Primary Examiner* — Taghi Arani
*Assistant Examiner* — Shu Chun Gao
(74) *Attorney, Agent, or Firm* — Knobbe, Martens, Olson & Bear LLP

(57) ABSTRACT

The invention provides a method of transmitting a media work such as a movie to a client comprising the steps of (a) encrypting the work using a sequence of different keys corresponding to respective temporally spaced segments of the document, (b) transmitting software code containing an algorithm from a security server to the client, the algorithm having a result that is a function of the state of the client, (c) executing the code at the client and returning the result to the security server, (d) determining whether the result is indicative of an unmodified client, and further comprising the steps of: (e) transmitting a segment from a server to the client, (f) securely streaming a key corresponding to the transmitted segment from a secure remote server to the client, (g) decrypting the segment using the obtained media key, (h) if step (d) indicates a modified client, preventing further keys from being transmitted, otherwise repeating steps (e) to (g) and repeating steps (b) to (d).

33 Claims, 3 Drawing Sheets

(56) References Cited

U.S. PATENT DOCUMENTS

| | | | |
|---|---|---|---|
| 7,080,257 B1* | 7/2006 | Jakubowski et al. | 713/187 |
| 7,124,445 B2* | 10/2006 | Cronce et al. | 726/26 |
| 7,243,226 B2* | 7/2007 | Newcombe et al. | 713/155 |
| 7,346,780 B2* | 3/2008 | Sinha et al. | 713/187 |
| 7,403,618 B2* | 7/2008 | Van Rijnsoever et al. | 380/239 |
| 7,779,394 B2* | 8/2010 | Homing et al. | 717/136 |
| 2001/0021975 A1 | 9/2001 | Pockrandt | |
| 2001/0036271 A1 | 11/2001 | Javed | |
| 2002/0085713 A1 | 7/2002 | Feig et al. | |
| 2002/0108050 A1* | 8/2002 | Raley et al. | 713/193 |
| 2002/0164023 A1 | 11/2002 | Koelle et al. | |
| 2003/0042301 A1* | 3/2003 | Rajasekaran et al. | 235/380 |
| 2004/0230797 A1* | 11/2004 | Ofek et al. | 713/168 |
| 2004/0243805 A1* | 12/2004 | Enokida | 713/175 |
| 2005/0120125 A1 | 6/2005 | Morten et al. | |
| 2006/0074807 A1* | 4/2006 | Gauba et al. | 705/51 |
| 2006/0085645 A1 | 4/2006 | Bangui | |
| 2006/0090209 A1* | 4/2006 | Garay et al. | 726/26 |

FOREIGN PATENT DOCUMENTS

| | | |
|---|---|---|
| EP | 1418725 | 2/2007 |
| GB | 2 401 008 A | 10/2004 |
| JP | 09-139849 A | 5/1997 |
| JP | 2002-092044 A | 3/2000 |
| JP | 2004-133801 | 4/2004 |
| JP | 2004-164640 | 6/2004 |
| JP | 2005-085188 | 3/2005 |
| WO | WO 99/27676 A2 | 6/1999 |
| WO | WO 02/21761 A | 3/2002 |
| WO | WO 02/23315 A2 | 3/2002 |

OTHER PUBLICATIONS

Grimen et al., "Software-based copy protection for temporal media during dissemination and playback", *ISISC 2005, LNCS 3935* (2006), 362-377.

Grimen et al., "Tamper protection of online clients through random checksum algorithms", *ISTA 2006*, 67-79.

Internet Streaming Media Alliance: "Internet streaming and alliance encryption and authentication specification version 1.0", http://www.isma.tv (2004), 9-10.

Macq et al., "Cryptology for digital tv broadcasting", *Proceedings of the IEEE* (1995), 83(6):944-957.

Messerges et al., "Digital rights management in a 3G mobile phone and beyond", *DRM '03* (2003), 27-38.

PCT international Search Report issued on Mar. 30, 2007 in Application No. PCT/GB2006/002619, filed Jul. 14, 2006.

\* cited by examiner

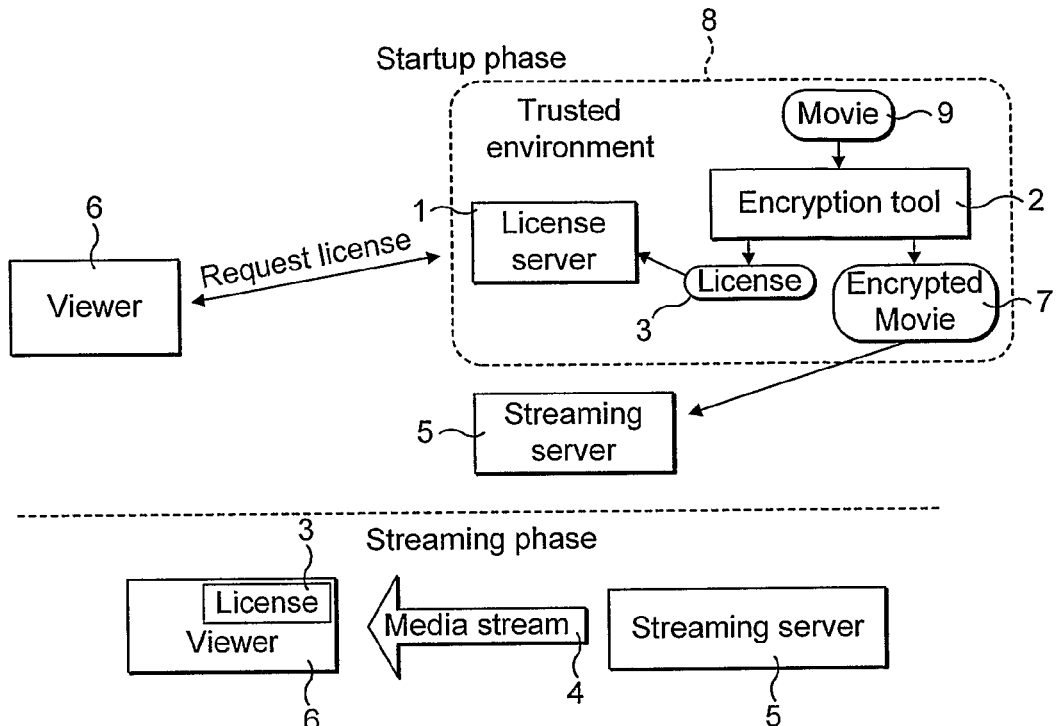
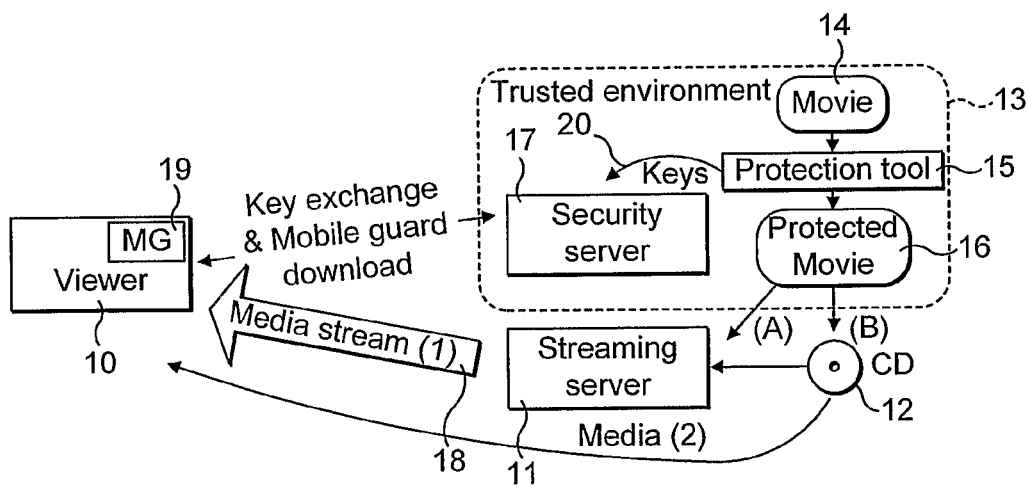
FIG. 1
FIG. 2

MULTIMEDIA DATA PROTECTION

CROSS REFERENCE TO RELATED APPLICATION

This application claims benefit and priority to and is a U.S. National Phase of PCT Application Number PCT/GB2005/002619, filed on Jul. 14, 2006, designating the United States of America and published in the English language, which claims priority to Application No: GB 0514492.8, filed Jul. 14, 2005. The disclosures of the above-referenced applications are hereby expressly incorporated by reference in their entireties.

The present invention relates to the secure distribution of multi-media works that have a temporal dimension such as movies, TV shows, audio documents, etc. In particular, it relates to a system for securely delivering such works to a user in a manner that prevents the user from obtaining an unauthorized copy of the work. Aspects of the invention also have applications in other server-client situations such as on-line banking, gaming, etc.

Illicit copying of artistic works is a perennial problem. In the early days of the movie industry, whilst it was possible for unauthorized copies of films to be made, it was expensive to do so and not practicable except for persons with access to specialist equipment. With the advent of home video recorders a new market for movies and other recorded programmes became available to producers whilst simultaneously it became possible for those recordings to be illicitly copied and distributed.

Today the DVD format, which provides higher quality playback and a more convenient and compact data carrier, is rapidly supplanting the video. In addition, with the advent of affordable broadband Internet connections, there is now an emerging market for downloading or streaming movies and other media from remote servers onto home computers.

Where a media work is downloaded, a copy of it is stored on the hard drive of the computer and it can normally be viewed repeatedly by the user, analogously to watching a video recording. Streaming content, whether live or recorded, is watched as it is transmitted to the computer (as with a conventional TV programme) in almost real-time (there is a short delay due to the need to provide some buffering). It is well known for radio and some TV stations to offer their content in this manner.

Whilst these improvements in technology have allowed the development of a promising new market for media companies, there is also a corresponding problem in preventing the production and distribution of unauthorized copies of the works. It now is commonplace for even low-cost home computers to have the capability to record content onto DVDs.

Techniques have therefore been developed with the aim of preventing such copying. In a conventional approach, the media supplier, who is referred to here as a "content provider", owns encoded media works, for example movies, which will be referred to generically as "media works". These are to be distributed and presented to a user's client program/viewer in a way that does not allow the user to create a copy of the encoded media work. The delivery can be carried out by either streaming over a network or by delivering a physical medium, for example a DVD, to the client.

Where the work is transported over a network it is usually secured by cryptographic means to protect the work from being intercepted and copied by a third party. We refer to these cryptographic means as "transport encryption". (Encryption, which is a security measure, is to be distinguished from encoding, whereby the work is converted and usually compressed into a form that can readily and efficiently be transmitted.) Encryption techniques are sufficiently well developed and secure that the communication over computer networks can be secured in an appropriate way.

Before the media work is delivered to the client, the content owner protects the encoded media document using cryptographic means. Within a secure "provider environment", an encryption tool is used to encrypt the work with a "media key" to create an encrypted encoded media work, the "encrypted work".

The intention is that the client can then only use the work if he has the media key that allows him to decrypt it. This can be embedded in the client program/viewer/player and/or the media, for example in DVD-players and DVDs. (The client program/viewer/player may be a free-standing device or a viewer software program on a computer.)

Another option, which is illustrated schematically in FIG. 1, is for the media key to be retrieved from a license server 1 on demand. This allows for streaming of the media work. To support this model, the encryption tool 2 wraps the media key, together with additional information, in a license 3 and sends this to the license server 1. The client then receives an encrypted, encoded media stream 4 from the streaming server 5 that has to be decrypted in a viewer 6 before it can be presented to the client. In order to watch the encrypted movie 7, the viewer requests a license containing the media key from the license server (see "Start-up Phase" in FIG. 1).

Once the viewer has received the license 3 (and therefore the media key), it connects to the streaming server 5 from which it receives an encrypted encoded media stream 4. The viewer uses the media key to decrypt the encrypted encoded media stream and present it to the client (see "Streaming phase" in FIG. 1).

A major problem in the scenario described above is that the viewer is executed on a host that is controlled by the client. Thus, the viewer is not executed in the trusted environment 8 (where the movie 9 was originally encrypted). There is, therefore, a risk that the client could modify the viewer. Even though the viewer will usually only decrypt and decode part of the media stream, during the whole presentation process every part of the encoded media stream will at some point be present in the viewer memory-image. Another risk is that, since the memory image of the viewer has to contain the key, the user could extract the media key, in which case he would be able to create a copy of the unencrypted encoded media.

The problem of modification exists for purely software-based viewers as well as for hardware-based viewers, for example, designated DVD players. Though it is more difficult to modify a hardware-based viewer than to modify a software-based viewer, it is not impossible. Thus there exists a need for a system that addresses these drawbacks.

General requirements for any effective protection mechanisms include the following: It should be resource-intensive to break so that the cost of breaking is at least of the same magnitude as the value of the work. Any successful attack should not be generalisable so that it can be applied elsewhere. It should preferably also facilitate detection. The various aspects of the invention described below address these requirements individually and the preferred forms of the invention provide a system that satisfies them all.

In the following discussion, a media work is a work that has a temporal aspect, i.e. it contains a number of presentational steps that have to be performed in an appropriate order. The steps are normally computationally independent of each other and can be processed independently. In most cases, the complete presentation takes a significant amount of time: many minutes or some hours in the case of a movie.

According to one aspect of the invention there is provided a method of transmitting a media work to a client comprising the steps of:

(a) encrypting the work using a sequence of different keys corresponding to respective temporally spaced segments of the work,
(b) securely transmitting a first key from a secure server to the client and transmitting the corresponding segment from a server to the client,
(c) in the client, using the first key to decrypt the corresponding segment,
(d) in the viewer, presenting the decrypted portion,
(e) repeating steps (b) to (d) in respect of further segments and keys.

The invention may be applied to any kind of media work (as defined above) that has a temporal aspect, and is particularly useful for distributing movies, for example streaming them over the Internet.

By dividing the document into a sequence of segments, it becomes impracticable to copy more than a small part because each key can decrypt only one segment, i.e. the keys are functionally independent. Thus, only one segment of the movie at a time can be copied. Furthermore, there should not be a master key that can unlock other keys, i.e. the keys should preferably be structurally independent. Preferably, thousands of different keys are used for a typical length of film such that each corresponds to a segment of a pre-determined length, e.g. of only a few seconds, say less than two or three seconds, and most preferably a second or less. Most kinds of media works only have significant value if they are substantially complete. For example, a movie with only the last few minutes missing will usually be of little value. Thus, someone seeking to illicitly copy a movie will have to decrypt each of the segments.

In order to maintain a continuous flow of data decryption, in some embodiments the client may ask for the current key and the next key(s) and cache a small number of keys (e.g. 2, 3, 4 or so) in memory.

Normally, the secure server is remote from the viewer, and is referred to herein as a 'security server'.

The movie is generally encrypted in a trusted environment. Preferably, the keys generated during encryption are supplied to the security server, which is within the trusted provider environment. However, although the keys are then transmitted from the security server to the viewer, the movie or other work may be transmitted from elsewhere. For example, it may be streamed from a separate server that is outside the trusted environment. Therefore, in one preferred embodiment, once the movie has been encrypted in the trusted provider environment, it is then supplied to a non-secure streaming server.

Thus, in this arrangement, the client, which may be a software viewer program running on a remote computer (e.g. a user's PC) communicates with a security server to receive the keys (referred to as media keys) and with a separate streaming server.

The media keys are preferably transmitted to the client following a request from the client, and this is preferably done using a key exchange protocol that makes use of a random data generator and the public key of the security server, which is known to the viewer.

In one implementation, when it is necessary to obtain the next media key, the client generates random data and encrypts it with the public key of the security server. The encrypted data may then be included in a request for the next media key, preferably with data identifying the client, which is sent to the security server. When it receives the request, the security server checks whether that client is entitled to receive the media work, decrypts and extracts the random data and performs a function using it and the requested key, to encrypt the key using the random data. In one embodiment, they may be XOR'ed. The result is then sent back to the client. When the client receives the result, it can then extract the requested key from the result by carrying out a corresponding function, for example by XORing it with the same random data that was provided in the original request for the key. In this way the encrypted, encoded media stream can be decrypted without any secret keys hidden in the source code of the viewer.

Preferably, the public key is included in the checksum calculation in order to prevent a "man in the middle" attack in which the public key is exchanged.

In a preferred form of the protocol, steps are also taken to ensure that the client checked by the mobile guard is the same one as the one generating the random data. This may be done by extending the input to the checksum to include the random data used to request the media key. Thus, the input to the checksum may include code from the client, the public key of the security server and the random data sent with the key request.

As external entropy sources can be monitored, the entropy source used for generating the random numbers may be that generated by the executing environment itself in the form of how tasks are scheduled and interrupted. Thus, the random generation process may consist of creating several threads that work on different computational tasks that can be input into a secure hash algorithm along with data from the current state of the viewer and the executing mobile guard.

The need for a continuing sequence of keys to be received by the client can be used to enforce user co-operation. Thus, if a certain step required by the provider is not carried out by the client, the supply of keys can be ceased. As will be discussed further below, this step may be an integrity check of the client, and preferably, the request for a new key is only responded to when a so-called "mobile guard" indicates that the viewer is unmodified.

Where the a mobile guard is employed, it is possible for it to generate the random number used in the preferred key exchange protocol described above, rather than the actual client viewer/player program.

It will be appreciated that this enforcement of co-operation is possible because the content provider controls the media work and because of the work's temporal nature, the work can be supplied in small parts with the user being required to co-operate in order to receive subsequent parts. This is in contrast to conventional systems where a licence unlocks the whole document, effectively neutralising the temporal property.

In an alternative embodiment of the invention the trusted environment is extended so that the streaming server is included within it. When this is done it is possible to have the streaming server generate media keys and encrypt the media stream on the fly. This ensures that each media stream is encrypted with a unique set of media keys. That means that a leaked media key cannot be used to decrypt a different copy of the same movie. To facilitate distribution of the media keys the streaming server sends them to the security server, which will distribute them to the viewer as described above. The downside is that another entity needs to be trusted and that the encryption on the fly is computationally expensive. Thus, there is a trade off here between very high security on the one side and complexity of the trusted environment and computational costs on the other side.

The invention is not limited to arrangements where the document is streamed from a remote server. Because it is encrypted, the document can be distributed in any convenient manner. Thus, the encrypted document may be provided to the client from a local server or on a physical medium (e.g. a DVD). The document may then be transmitted from the local server or physical medium to the viewer and decrypted in the same manner as previously discussed.

Although this arrangement provides a significant improvement over the prior art system, there still remains the risk that the viewer could be tampered with so that the decrypted work (movie etc.) could be recorded and copied. Thus, preferably, the invention further comprises means for checking the integrity of the viewer to ensure that it has not been tampered with. This may be done by programming it to send a signal such as a checksum to the security server at regular intervals, and/or when a key is requested. Such a signal would be designed to depend on the state of the viewer so that any modification to the viewer would change the signal.

However, there is a risk that such a measure could be overcome by programming the modified viewer to send the "correct" signal regardless of its true state. Preferably, therefore, the method further requires that the security server interrogate the viewer using a number of different tests, which vary with time. In a particularly preferred form, the tests comprise the use of randomly generated algorithms which will only return the correct result if the viewer is unmodified. Furthermore, failure to respond or an undue delay in responding can be taken as an indication of viewer modification.

Thus, preferably the security server is arranged to cease the supply of keys in the event that viewer modification is detected and/or if such a viewer integrity check is not successful.

The most preferred arrangement is for the algorithms to be transmitted by the security server to the client in the form of software code (e.g. machine code). The software code may be termed a "mobile guard", and is described further herein.

Such a system of integrity checking is considered to be an inventive concept in its own right and therefore, viewed from a further aspect, there is provided a method of transmitting data to a client comprising the steps of:
 (a) transmitting the data to the client,
 (b) transmitting software code containing an algorithm from a security server to the client, the algorithm having a result that is a function of the state of the client,
 (c) executing the code at the client,
 (d) returning the result to the security server, and
 (e) determining whether the result is indicative of an unmodified viewer.

The data may be a media work that is streamed to the client, for example over the Internet, or it can be supplied from a local server, DVD or other media as discussed above. However, as will be discussed more fully below, it may be any kind of data that can be transmitted between server and client. The client may be a program running on a computer or a hardware device such as a TV set-top box. The algorithm referred to in step (b) may be transmitted before any part of the document has been transmitted, or the whole or part of the work may be transmitted before the algorithm. Preferably, the document is not viewed until after step (d) has been carried out.

Depending on the outcome in step (d), appropriate action can be taken. Where the work is being streamed, if the viewer is found to be unmodified, the transmission of the work and of any keys required to decrypt it would normally be allowed to continue. However, there may be a further step of (e) ceasing the transmission of the work and/or keys necessary to decrypt it in the event that the result is not indicative of an unmodified client. Preferably, if no result is returned from the mobile guard, this is also deemed to indicate that the client has been modified.

Where the work is being transmitted from a local source such as a local server, DVD, etc. the action may be to cease the transmission of the keys needed to decrypt the document.

Alternatively, other action may be taken if it is found that the client has been modified. For example, the transmission could be allowed to continue and evidence gathered to identify the user. This may be appropriate if it is desired to take legal or investigative action, e.g. to detect criminal activity or to prevent future illicit copying of documents.

As noted above, the action taken in response to the identification of a modified client may be to cease transmission of decryption keys. It will therefore be appreciated that the method may further comprise dividing the work into a plurality of temporally spaced segments, which are encrypted using different keys. These keys may be distributed to the client sequentially, and preferably as discussed above. Thus, if their distribution is ceased, the remaining part of the work cannot be decrypted.

The method is preferably carried out using randomly generated secret algorithms in the software code (as mentioned above). These so-called enforcement algorithms generate a result that is dependent on the state of the client (e.g. of a viewer program), but the correct result is not guessable by the user because of the random aspect. Preferably, they contain a checksum calculation into which the viewer program's code is input. Although the algorithm as a whole is secret, the checksum calculation may be a known one such as the Message Digest Algorithm 5 (MD5) (RFC1321 www.faqs.org/rfcs/rfc1321.html), which may be used in combination with randomized input modification.

Input modification refers to the random creation of a modifier that permutates the data that will be input into the checksum. In one implementation, when the software code (referred to here as a "mobile guard") is generated, a random sequence is determined. When the algorithm is executed, the input code from the viewer is divided into n blocks of the same size. These are then shuffled into the above-mentioned random sequence and the result is then input into the checksum algorithm. Although in this arrangement the checksum algorithm itself is public, its result is a function of the order in which the n blocks are input to it. This order is known to the security server and so the security server can determine whether the result returned to it indicates an intact viewer.

An alternative approach to creating an input-filtered checksum is to decompose a known checksum algorithm and reassemble it in a way that reads the input in a given sequence.

Instead of using input filtering, it is possible to generate a checksum function from scratch. Thus the input can be split into l words (32 bits) and a function f is created that reads l words from the input and m words from a variable area that outputs a word. The function may comprise a random number of assignments that are performed one after another and the checksum may be the sum modulo $2^{32}$ of all the results of the application of f.

Composing functions has the advantage that almost all code of the checksum algorithm is randomly created, leading to more structural diversity in the code. Since the building blocks are quite small, it allows for easier interleaving with other algorithms.

The software code also preferably contains additional algorithms, which may be secret or non-secret. They are preferably functionally and/or spatially entangled with the secret algorithm. In this way the client's computer/viewer can be forced to carry out the additional algorithms because if it does not the secret one will not be implemented. The additional algorithms may be used, for example, to check the integrity of viewer hardware.

As the mobile guard is present in the same environment as the viewer, it is potentially vulnerable to attacks. A user might try to modify it in order to circumvent the protection methods it implements. Automated attacks on it can be prevented by ensuring that the mobile guards are partly randomly created, as discussed above. In addition, obfuscation transformations may be applied to the mobile guards. The mobile guard may hide the checksum in an opaque data structure that is interleaved with the checksum in a way that is specific to the mobile guard. Variables may be located randomly in the mobile guard's memory and, in addition, the mobile guard's instructions may be split into blocks, which are also located randomly in memory. This preferably includes the entry point into the mobile guard. Indeed, the entry point for one mobile guard can be provided by the previous one.

If these steps are carried out, a human attack then becomes necessary to overcome the obfuscation before any automated attack can commence. Such an approach inevitably takes a significant amount of time and so provided the "trust interval" between successive mobile guards is sufficiently short, it will not be effective. In other words, because the mobile guards are replaced frequently, there is insufficient time for this to be worthwhile. Thus, the obfuscation process protects the mobile guard from tampering in the time interval before it is replaced by another mobile guard.

There is a risk of an observer spying on memory locations in a computer where the decrypted movie data is stored. If a known memory location is used then the data could be copied. Therefore, it is undesirable for it to be practicable to locate code by identifying a certain memory location (location-based identification) and preferably, once locations have been used, they should not be re-used. Also, pattern-based identification—where code may be sought by looking for sequences like MPEG headers—should preferably be prevented too.

The viewer is, therefore, preferably protected by the mobile guard against its state being determined by spying. To do this the mobile guard will preferably further comprise one or more protection algorithms to protect against such attacks. This it may perform obfuscation tasks on the client (e.g. on a viewer program), referred to hereinbelow as "runtime viewer obfuscation", i.e. obfuscation is carried out on the viewer as it runs. This changes the memory image of the running viewer.

This runtime viewer obfuscation is considered a further inventive concept, and thus from another aspect, the invention provides a method of obfuscating an executing viewer, comprising randomising the memory image of the executing viewer.

Runtime obfuscation may comprise one or more of the following techniques.

Code relocation comprises moving code blocks around in memory. As the program executes, the mobile guard will move the code to other parts of memory, which will then later be executed. This algorithm is preferably tightly interleaved with the checksum calculation.

Preferably, code relocation is implemented by (1) identifying all the basic building blocks in the program and partitioning it into small relocatable segments; (2) during execution of the mobile guard these segments may be rearranged in memory to random locations; and (3) modifying all jump instructions to correspond to the new code locations. As a result, an attacker will be confronted by a memory image that changes during the execution of the mobile guard. Since the location of the segments is determined by the mobile guard provided by the security server, it is unpredictable to the attacker who cannot then rely on the assumption that certain memory locations contain certain data.

Data relocation comprises moving the data and changing the instructions that access it. Again, the new locations can be determined randomly.

Data hiding addresses the problem of location and pattern-based identification. One approach is to apply a two-way function to alter the appearance of the data—effectively to mask it. Preferably, a simple one-time pad approach is used. It may comprise a newly created modulo function that creates an index into an array of random data. The random data may be used to alter the sensitive data by applying the XOR operator between the random and sensitive parts. Preferably it is applied between these and part of the address of the sensitive data.

One approach is to scramble (mask) and unscramble the data so that sensitive data is stored in scrambled form, unscrambled when needed, and then re-scrambled or deleted. However, this does leave a short window when the data is unscrambled.

However, it is possible to take advantage of stream processing to delay the unscrambling until the data is in the processor's registry.

Thus, the actual content decoder may be modified to perform the last decryption operation, as it needs new data. This means that there will not be any decrypted data present in main memory at all. It may be provided using the following steps:

a) The Mobile guard modifies the decoder to perform the last decryption step as needed;
b) The next encrypted segment is obtained;
c) Media key for the encrypted segment is obtained;
d) The decryption stream is generated and placed in random places in memory according to how the decoder was modified;
e) The decoder will then read a byte or a word at a time and decrypt them as needed.

Code diversification comprises operations performed by the mobile guard on the client program during execution. The operations performed change the code such that it consists of different instructions without changing its semantics. This is to prevent pattern-based identification. One or more of the following steps may be carried out:

Context-independent instructions may be inserted. These are instructions whose input context may be shared with contexts in the program but whose output context is different from any input context in the program. Since they cannot alter any input context of the program, it does not matter what they process.

Context dependent instructions may be replaced by instructions that perform the same function. It will be appreciated that this is more difficult to achieve, but it is also more effective because they cannot be identified by data-flow analysis.

Functional independent changes that can be made include changing the order of execution of instructions, inserting instructions with or without temporary variables, re-ordering instructions in memory and making control flow changes.

Functional dependent changes require care in order to keep the function and side effects intact. They include replacing instructions with functional equivalents, introducing identity functions, introducing operators so that literal values are replaced by instructions that initialise the value arbitrarily and perform an operation that corrects the value to match the original literal. Also, variables can be introduced so that copies to a destination are replaced by copies of a newly created variable.

In an embodiment in which a hardware-based viewer solution is employed, for example a TV set-top box, the distributor of the viewer controls not only the viewer software, but also the viewer environment, i.e. the hardware and operating system. Therefore, a hardware based viewer can generally be checked by a mobile guard in a much more complete manner than a purely software based solution. In this embodiment, the checksum algorithm in the mobile guard is not restricted to checking the viewer software but can also check different aspects of the operating system and the hardware.

Thus, the system can be used in two ways in connection with hardware-based viewers. Firstly, it can be used to replace solutions that are based on expensive tamper-proof hardware. Secondly, it can provide additional security measures that come into play in the event that the tamper-proof hardware should be compromised.

It will be seen that the invention preferably relates to the combination of individually encrypted segments of the document and the use of the "mobile guard" concept. Thus, viewed from a still further aspect, the invention provides a method of transmitting a media work to a client comprising the steps of:
  (a) encrypting the work using a sequence of different keys corresponding to respective temporally spaced segments of the work,
  (b) transmitting software code containing an algorithm from a security server to the client, the algorithm having a result that is a function of the state of the client,
  (c) executing the code at the client and returning the result to the security server,
  (d) determining whether the result is indicative of an unmodified viewer,
  (e) transmitting a segment from a server to the viewer,
  (f) in the event that the result is indicative of an unmodified viewer, securely streaming a key corresponding to the transmitted segment from a secure remote server to the viewer,
  (g) decrypting the segment using the key.

It will be appreciated that although the steps may be executed in the order in which they are given above, at least some of the steps may be executed in a different order, or concurrently. For example, step (e) may be carried out concurrently with steps (b), (c), (d) or (f), such that the segments are transported before, with or after the keys. However the keys must be available before the segment is decrypted.

In one embodiment, the method comprises a further step (h) wherein steps (b) to (g) are repeated.

However, generally, the transmitted software code has a certain 'lifetime' or 'trust interval', for example less than 30 seconds. On the other hand, segments are generally transmitted more frequently than the lifetime of the software code, for example one per second. As such, new software code does not need to be transmitted each time a segment is transmitted, but will generally only need to be transmitted once the lifetime of the present software code has expired. Thus, steps (e) to (g) will generally be repeated until new software code is required, when step (b) will be repeated. In this way one piece of software code (mobile guard) protects the delivery of many keys.

Although the execution of the code and determination of whether the result is indicative of an unmodified viewer (steps c and d) can be done more than once for each piece of software code, generally, it will only be necessary to do it once during the lifetime of the software code. As such, steps (c) and (d) will generally only be repeated after step (b) has been repeated.

Viewed from a still further aspect, the invention provides a method of transmitting a media work to a client comprising the steps of:
  (a) encrypting the work using a sequence of different keys corresponding to respective temporally spaced segments of the work,
  (b) transmitting software code containing an algorithm from a security server to the client, the algorithm having a result that is a function of the state of the client,
  (c) executing the code at the client and returning the result to the security server,
  (d) determining whether the result is indicative of an unmodified viewer,
and further comprising the steps of:
  (e) transmitting a segment from a server to the viewer,
  (f) securely streaming a key corresponding to the transmitted segment from a secure remote server to the viewer,
  (g) decrypting the segment using the obtained media key,
  (h) if step (d) indicates a modified viewer, preventing further keys from being transmitted, otherwise repeating steps (e) to (g).

Preferably, the method further comprises the step (i) of repeating steps (b) to (d).

It will be appreciated that although the steps may be executed in the order in which they are given above, at least some of the steps may be executed in a different order, or concurrently. In fact, some steps may be carried out more times than others.

Steps (b) to (d) can be carried out independently of steps (e) to (h), and are preferably carried out concurrently therewith. As mentioned previously, the software code generally has a lifetime that will encompass the sending of many segments and keys. As such, the repetition of steps (b) to (d) (mentioned in step (i)) will generally be carried out less frequently than the repetition of steps (e) to (g) (mentioned in step (h)). Preferably, step (i) is only carried out if the lifetime of the software code has expired.

The invention also extends to apparatus configured to operate as discussed above, including a client configured to receive such streamed media and also the server arrangement, both in combination and separately. Thus, from a still further aspect it may provide a system for delivering a media work to a client comprising:
  (a) means for transmitting the work to the client,
  (b) means for transmitting software code containing an algorithm from a security server to the client, the algorithm having a result that is a function of the state of the client, and
  (c) means associated with the security server for receiving the result and determining whether the result is indicative of an unmodified client.

Another aspect provides a client, e.g. a viewer for playing a work such as a movie, the client being arranged to: receive the work and to receive software code containing an algorithm from a remote source; to execute the algorithm on the client; and to return a result of the algorithm to the remote source, thereby demonstrating the integrity of the client to the remote source and enabling the playing of the document.

The client preferably enables the playing of the work by decrypting it, or decrypting a segment of it using a key supplied to it by the remote source. Preferably the client is configured to request a sequence of keys and uses the keys in sequence to decrypt consecutive sections of the work, which are then played as a continuous presentation. Preferably, as discussed above, the provision of keys is dependent on the client demonstrating its integrity to the source.

The invention also extends to a combination of a system for delivering works as described above, in combination with a client, whereby documents are delivered to the client and can only be played if the viewer demonstrates its integrity to the source.

It will be seen that, in contrast to prior art software solutions, the present invention does not rely on secrets that are contained in the data that is made available to the user, whether in the program code or in the media documents. It allows the early detection of copy attempts and allows the content provider to initiate counter-measures before a substantial part of the media document can be copied.

It has also been recognized that the concept of checking system integrity using a mobile guard has other applications beyond the transmission of documents (as defined) to a client. It can be used generally to verify the integrity and authenticity of code that is run in uncontrolled environments that perform calculations on input data. It can be used to prevent a party from changing the way that data is processed without this being detected. Thus, the discussion above in relation to a media viewer can be applied to any client program. Applications include games, banking, audio, etc.

Thus, viewed from a still further aspect, the invention comprises transmitting software code (such as a mobile guard) from a secure source to a client computer running a client program, the software code comprising an algorithm having a result that is dependent on the state of the client program, executing the software code and returning the result to the source, whereby the source can determine the integrity of the client program. The invention also extends to apparatus arranged to operate in accordance with such a method.

This aspect of the invention may employ any or all of the preferred features discussed above, in particular concerning the mobile guard. References above to media works apply likewise to temporal payload data sent between server and client. Thus, the service provider can enforce the cooperation of the user's client in the same manner and can withhold further payload data if either cooperation ceases or tampering is detected.

Thus, it will be appreciated that any client that is in communication with a server can have its integrity checked on an on-going basis. The invention therefore allows a client that operates in an uncontrolled environment to be trusted. If it transpires that the integrity of a client has been compromised then action can be taken. For example, communication with the client could be terminated, the provision of decryption keys suspended (as with the media streaming applications discussed above) and/or steps taken to gather evidence (e.g. in the case of suspected fraudulent attacks on banking systems).

The invention is useful in the context of distributed calculations where, although confidentiality and dishonesty are not usually issues, the correct execution of software is. Thus, the mobile guard may be used to protect against intentional or unintentional modification of the client—both its software and, if required, hardware. Thus, the instance that launches the distributed computing job can use mobile guards to check the correct operation of the clients at remote nodes that carry out calculations.

In the context of on-line gaming, modification of client programs can enable cheating which, if uncontrolled could cause customer dissatisfaction and lead to loss of revenue. The data concerned is not confidential and there is little point in recording it (as with a media work), so it is normally sufficient to verify only the integrity of the client software. Where the game operated on a client-server basis, mobile guards can be applied as discussed previously. If the user does not allow cooperation with the mobile guard then he can be refused updates on the global game-state.

In the case of home banking, mobile guards can be used to make sure that third parties do not access confidential data. While a normal user will not normally be interested in modifying his client program, he may be the victim of a man-in-the-middle attack. The banking server could therefore use a mobile guard to verify the integrity and authenticity of the home banking client and it may also contain the public key of the banking server. This public key is used to encrypt all data that is passed from the home banking client to the banking server and since the integrity of the mobile guard is guaranteed, the user can be sure that his data is kept confidential.

The invention extends to apparatuses configured to employ the methods described above and to software products containing instructions to cause computers to operate in such manner. It also extends to server-client combinations and/or networks where data is supplied to the client in accordance with the aspects of the invention discussed above.

Certain embodiments of the invention will now be described, by way of example only, with reference to the accompanying drawings:

FIG. 1 is a schematic drawing of a prior art media streaming system as described above;

FIG. 2 is a schematic overview of a first embodiment of the invention;

Figure 3:
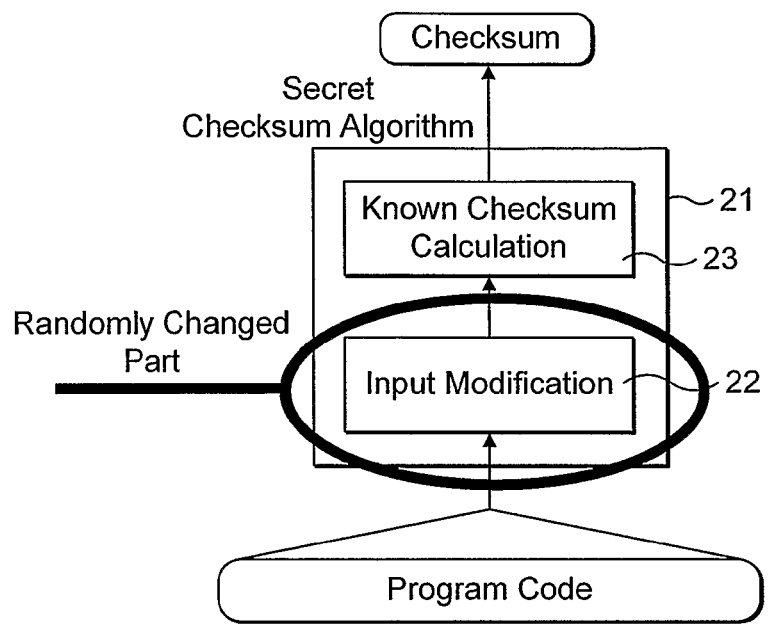
FIG. 3 is a schematic diagram showing the components of a randomly generated checksum algorithm as used in the embodiment.

As may be seen from FIG. 2, a client is provided with a viewer 10 which can be used to view media (e.g. a movie) that is streamed from a streaming server 11 or alternatively from a local storage media, e.g. CD 12. Each of these components of the system is outside the trusted environment 13. Within the trusted environment is the unencrypted movie 14, a protection tool 15 to generate a protected movie 16 and a security server 17.

As in the prior art system illustrated in FIG. 1, the content owner protects the encoded media document, before it is delivered to the client. However, instead of using a single media key, protection tool 15 encrypts the movie with a very large number (thousands) of media keys 20. This process yields an encrypted, encoded media, the protected movie 16.

The media keys 20 are distributed so that they are spread out in time; during presentation of a media resource, they are securely streamed to the client one at a time at intervals on request as will be described below. The media itself is streamed separately. Each key comprises only a few bytes (about sixteen) so the resources needed to stream the keys create a very low overhead.

Each key can be used to decrypt only about a second, or at most a few seconds, of the movie so that obtaining only a single key is of little value.

In the first embodiment of the invention, the protected movie is delivered to the client in form of a data stream via path A, streaming server 11 and media stream 18. In further embodiments, tangible media, e.g. a CD or DVD 12 are used.

The viewer 10 is executed on the client's host and is arranged to receive the protected movie 16 from the streaming server 11 via media stream 18 (or from the CD/DVD in other embodiments). During the presentation process, the viewer 10 communicates with a security server 17 to download the necessary media keys 20 to decrypt the protected movie 16.

In addition, the viewer 10 also downloads pieces of code called mobile guards 19 at regular intervals of about 30 seconds. These each have embedded within them secret information in the form of an algorithm that is created in the security server 17. The execution of these algorithms is necessary to make use of the streamed data 18. When each mobile guard 19 is transferred into the viewer it performs calculations determined by the secret algorithm and returns the result to the security server. The mobile guard is structured in such a way that the result of the calculation is only correct if the viewer has not been tampered with. The result of the secret algorithm contains a checksum that proves the integrity of the viewer to the security server.

The mobile guard can also have other additional algorithms functionally and spatially entangled with the secret algorithm. In this way the client's computer/viewer can be forced to carry out the additional algorithms because if it does not the secret one will not be implemented. In this way, the viewer may be fully checked.

If the result returned to the security server 17 by the mobile guard does not match the expected result, the security server stops the distribution of the media keys 20 to the viewer. The same happens if the viewer 10 refuses a mobile guard or if the correct result does not arrive within a certain time. The key exchange protocol will be explained in more detail later.

The secret algorithms are based on checksum calculations that have a high probability of detecting changes in the checked data (i.e. the viewer code). As may be seen from FIG. 3, a randomly generated checksum algorithm 21 (for use in a mobile guard) uses a checksum calculation divided into two steps: input modification 22, which is randomized, and a known checksum calculation 23 which is performed on the modified input. These steps together make the randomized and secret checksum algorithm.

Input modification refers to the random creation of a modifier that permutates the data that will be input into checksum calculation 23. When a mobile guard is generated by the security server, a random sequence is determined. When the checksum algorithm 21 is executed by the viewer, the input Program Code from the viewer is divided into n blocks of the same size. These are then shuffled into the above-mentioned random sequence in the Input Modification stage 22. The result of this is then input into the Checksum Calculation stage 23. This uses the known Message Digest Algorithm (MD5). The checksum calculation is then carried out and its result returned to the security server.

It will be appreciated that although the checksum algorithm itself is public, its result is a function of the order in which the n blocks are input to it. This order is known to the security server and so the security server can determine whether the result returned to it indicates an intact viewer.

The mobile guard needs to be protected against tampering and against the spying out of its inner workings. The first aspect of the protection of the mobile guard is to randomly create new versions each time a viewer needs to be checked. Secondly the lifetime of the mobile guard in the viewer environment when it is being used is short (less than thirty seconds). Although human (i.e. intelligent, as opposed to automated) attacks on the mobile guard are theoretically possible, they would take a significant amount of time. By having an expiration time of some seconds for each mobile guard, human-assisted attacks therefore become virtually impossible because the mobile guard is redundant long before any attack can be completed.

The mobile guard is obfuscated, as previously discussed, to defend against an automated attack.

The mobile guard randomises the memory image of the running viewer, referred to herein as 'runtime viewer obfuscation'. Code and data areas of the viewer are swapped and the stack is scrambled. This is discussed more fully below.

The effect of runtime viewer obfuscation is to make sure that only intellectual attacks can be performed on the runtime image of the viewer because it randomises and thereby hides the memory locations of the decrypted, encoded stream.

In order to randomize the location of memory accesses, the mobile guard modifies the structure of the viewer code and the data area. The code and data area are split into logical segments. Care is taken that segment borders are not located inside opcodes.

After a newly downloaded mobile guard receives control and before starting with the decryption of the stream, the mobile guard relocates the segments to new positions. This process includes the modification of code segments—similar to relocation performed by dynamic linkers—to make sure that:

1. Jump- and Branch-instructions are transferring control to the relocated positions.
2. Read- and Write-instruction are accessing the data at the relocated positions.

After relocating the segments, the mobile guard performs its operation until it is replaced by the next mobile guard.

The mobile guard needs to know the entry points of certain functions in the viewer. The new positions of the segments are known by the security server and provided to the mobile guard. In this way there is no need to transfer information between two mobile guards on the client side.

With regard to stack scrambling, the stack contains the return addresses to prior function calls. This can be used to either spy out control flow or to alter the control flow of the viewer by changing a return address on the stack. In such an attack, when the program is about to jump back to the calling function, it could instead be transferring control to possible hostile code.

To protect the stack against such an attack, a method is used that gradually scrambles the stack as new return addresses are added to it. The checked code will, after a function call, transfer control to a scramble function in the mobile guard, which scrambles the new return address on the stack before returning control back to the calling function. To unscramble the stack a corresponding unscramble function in the mobile guard is called before using any return address.

The implementation of the scramble function takes advantage of the fact that mobile guards are created as needed in order to check the viewer. This enables a unique scramble and unscramble function to be created in each mobile guard. The scramble function basically consists of a set of random data created by the security server and contained in the mobile guard that is XORed with the return addresses on the stack of the viewer. To select which part of the random data to use, a simple mathematical function is applied to compute an index into the set of random data.

The viewer is therefore protected by the mobile guard against its state (including the position of the control flow and variable content) being determined by spying (as discussed previously).

The media keys are transmitted at a rate of approximately one per second to the viewer. This is done using a key exchange protocol that makes use of a random data generator and the public key of the security server, which is known to the viewer. When it is necessary to obtain the next media key the viewer 10 generates sixteen bytes of random data and encrypts them with the public key of the security server 17.

The encrypted data is then included in a request for the key, which is sent to the security server.

The security server examines the request and only approves it if the mobile guard indicates that everything is correct in the viewer. If the mobile guard indicates that everything is fine, the security server extracts the random data, XOR's it with the requested key and sends the result back to the viewer.

When the viewer receives the result, it extracts the requested key from the result by XORing it with the same random data that was provided in the original request for the key.

This protocol provides a way to decrypt the encrypted, encoded media stream, without any secret keys hidden in the source code of the viewer. The lifetime of a key is a only few seconds, which prevents the secure streaming process from constituting a single point of failure in the event of the extraction of one or a few secret keys.

Figure 4:
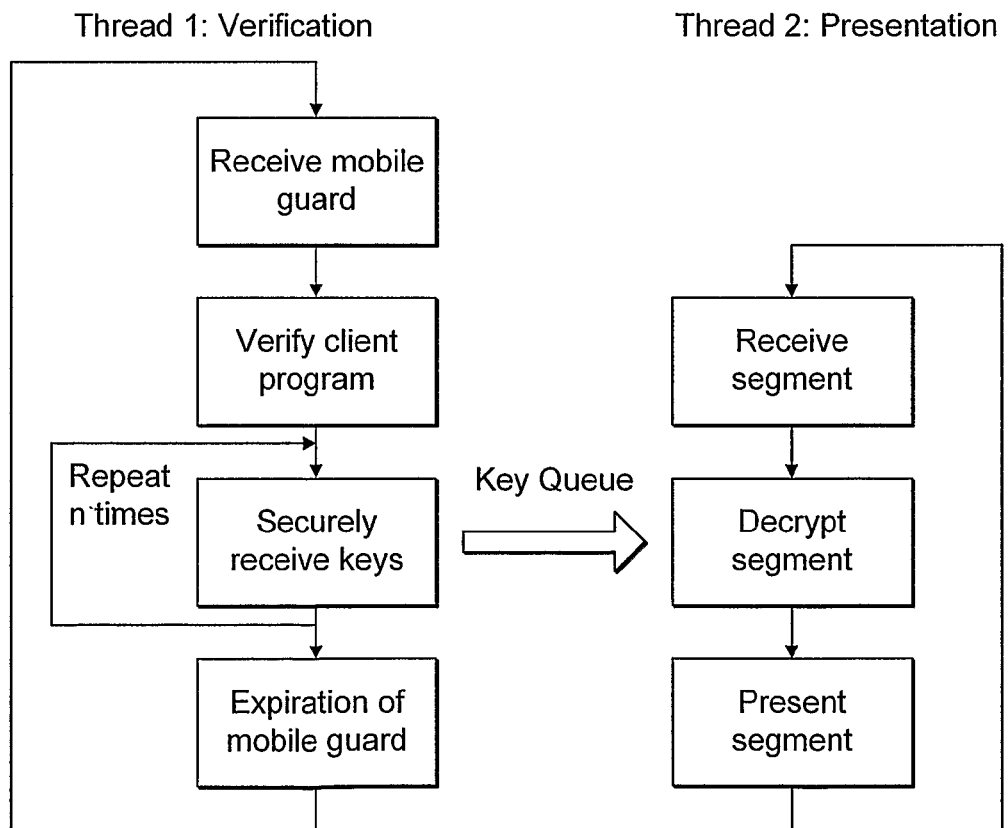
FIG. 4 is a flow chart showing the operation of the embodiment.

It will be appreciated that there are effectively two separate threads that are carried out by the client and these are summarised in the flow chart of FIG. 4.

The first thread is verification. The client receives a mobile guard, which then verifies the client program. Once verification has been confirmed, a number n of keys can be received during the following trust interval until the mobile guard expires. The thread must then be repeated with a new mobile guard.

Running in parallel to this is the presentation thread. For each key, a segment of the media stream is received decrypted and presented.

Figure 5:
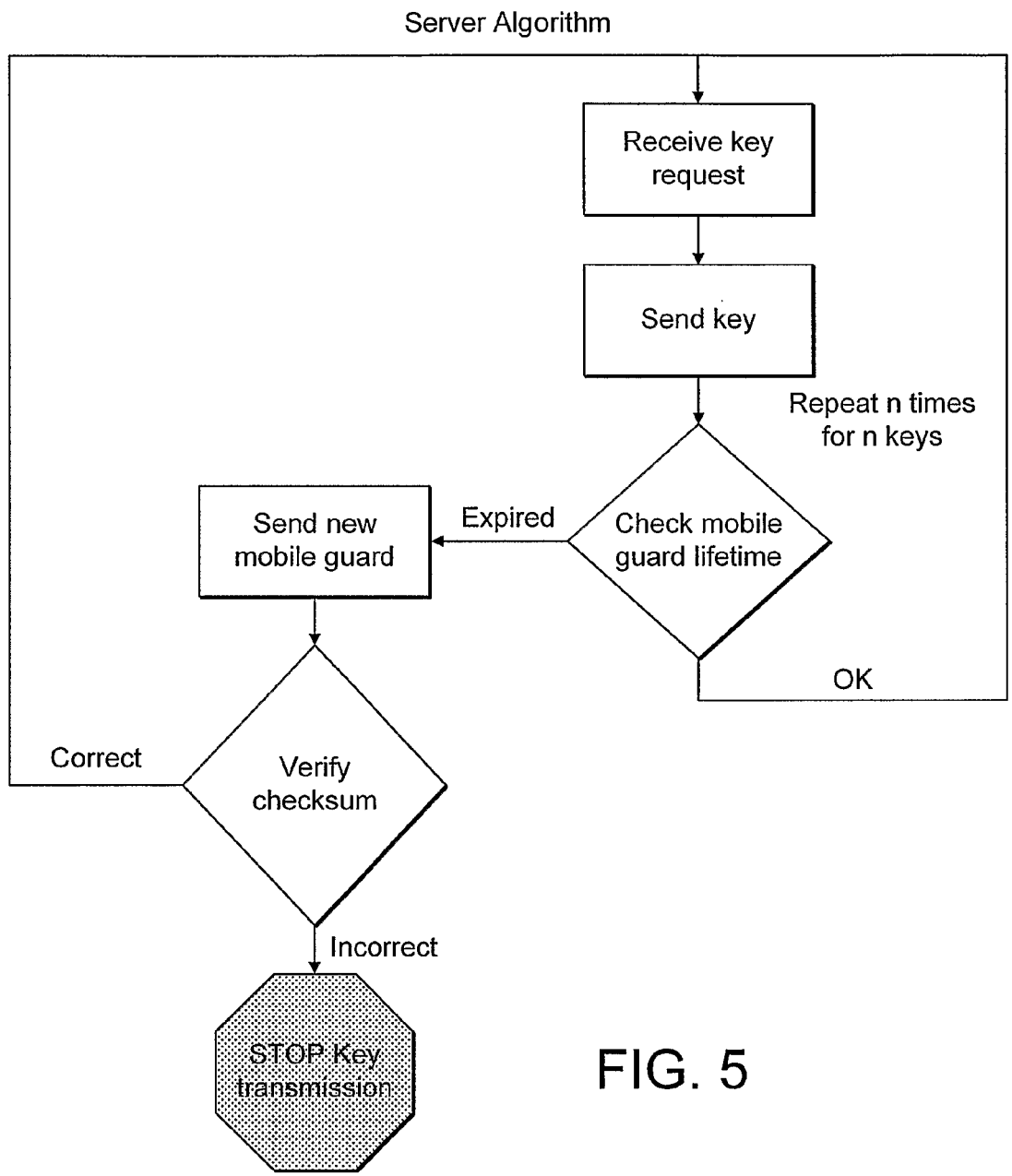
FIG. 5 is a flow chart of the server algorithm employed in the embodiment.

FIG. 5 summarises the operation of the server. On receiving a key request, it sends a key to the client if, and only if, the mobile guard is still alive (i.e. if it is still within the trust interval of that mobile guard). If the mobile guard has expired, a new mobile guard is sent to the client and this is used to verify the client. If the result is incorrect, the client is deemed to have been tampered with and key transmission is then stopped. If the result is satisfactory, then a new trust interval commences and during it the keys are sent to the client.

The invention claimed is:

1. A method of transmitting data to a client computer running a client program, the method comprising:
   (a) transmitting the data to the client program,
   (b) transmitting software code containing a randomly generated algorithm from a security server to the client program, the algorithm having a result that is a function of a state of client program, the software code further containing a checksum calculation into which a random number and code of the client program and memory image of the client program is input,
   (c) executing the software code at the client to provide a result of the algorithm, a first calculated checksum, wherein the client program encrypts the random number with a public key of the security server and the encrypted random number is transmitted to the security server with a request for a key and the first calculated checksum, and
   (d) determining whether the result is indicative of an unmodified client program, wherein the security server decrypts the random number and uses it to encrypt the key, and wherein the security server uses the random number to calculate a second checksum, and the security server then compares the first and second calculated checksums.

2. A method as claimed in claim 1, wherein the data is a media work.

3. A method as claimed in claim 2 wherein the data is one of a plurality of temporally spaced segments of the work and wherein each segment is encrypted using an encryption key.

4. A method as claimed in claim 3 wherein if step (d) indicates that the result is indicative of an unmodified client program, the method further comprises the step of transmitting a decryption key corresponding to the transmitted segment to the client program.

5. A method as claimed in claim 4, further comprising the step of (e) ceasing the transmission of the data and/or of keys necessary to decrypt the data in the event that the result is not indicative of an unmodified client program.

6. A method as claimed in claim 3, wherein the method further comprises the step of transmitting a decryption key corresponding to the transmitted segment to the client program.

7. A method as claimed in claim 6, further comprising the step of ceasing the transmission of the data and/or of keys necessary to decrypt the data in the event that the result is not indicative of an unmodified client program.

8. A method as claimed in claim 1, wherein the client program is prevented from using the data until after step (d) has been carried out.

9. A method as claimed in claim 1, wherein if, and only if, the two values are equal the encrypted key is transmitted to the client program such that the client program may decrypt the key.

10. A method as claimed in claim 9, wherein, if the two values are not equal, it is determined that the client program has been tampered with.

11. A method as claimed in claim 1, wherein the code performs obfuscation task(s) on the client program.

12. A method as claimed in claim 11, wherein the obfuscation task(s) comprise randomising the memory image of the executing client program.

13. A method as claimed in claim 11, wherein the obfuscation tasks include one or more of the following: code relocation, code diversification, data relocation, and data hiding.

14. A method as claimed in claim 1, wherein the software code transmitted from the security server to the client program is obfuscated.

15. A method as claimed in claim 1 wherein steps (b) to (d) are repeated and the algorithms vary.

16. A method as claimed in claim 1, further comprising returning the result of the algorithm to the security server.

17. A method as claimed in claim 16, wherein the step of determining is carried out at the security server.

18. A method as claimed in claim 1, further comprising returning the result of the algorithm to the trusted environment.

19. A method as claimed in claim 18, wherein the step of determining is carried out at the trusted environment.

20. A method as claimed in claim 1, wherein the software code contains a checksum calculation into which at least a part of the memory image of the client is input.

21. A method as claimed in claim 1, wherein the software code contains a checksum calculation into which instructions of the client program are input.

22. A method of transmitting a media work to a client computer running a client program, the method comprising:
   (a) encrypting the work using a sequence of different keys corresponding to respective temporally spaced segments of the work,
   (b) transmitting software code having an associated trust interval and containing a randomly generated algorithm from a security server to the client program, the algorithm having a result that is a function of a state of the client program, the software code further containing a checksum calculation into which a random number and the software code of the client program or memory image of the client program is input, (c) receiving the result from the software code at the client program, including a first calculated checksum, the random number encrypted with a public key of the security server, and a request for a key, (d) determining whether the result is indicative of an unmodified client program, wherein the security server decrypts the random number and uses it to encrypt the key, the security server uses the random number to calculate a second checksum and the security server then compares the two checksum calculations, (e) transmitting a segment from a server to the client program, (f) in the event that the result is indicative of an unmodified client program, securely streaming a key corresponding to the transmitted segment from a secure remote server to the client program during the associated trust interval, and (g) decrypting the segment using the key.

23. A method as claimed in claim 22, further comprising a further step (h) wherein steps (b) to (g) are repeated.

24. An apparatus for delivering data to a client computer running a client program, comprising:

(a) a first hardware processor configured to execute software code;

(b) first software code, executed by the first hardware processor, configured to transmit the data to the client program;

(c) second software code, executed by the first hardware processor, configured to transmit third software code containing a randomly generated algorithm to the client program, the algorithm having a result that is a function of a state of the client program, the third software code further containing a checksum calculation into which a random number and at least one of code of the client program and a memory image of the client program is input to provide a first calculated checksum; and (d) the third software code, executed by a one of the first hardware processor and a second hardware processor, configured to receive the result, the result including the random number encrypted by the client program with a public key, a request for a key, and the calculated checksum, and determine whether the result is indicative of an unmodified client program, wherein the random number is decrypted and used to encrypt the key, the random number is used to calculate a second checksum to provide an updated checksum, and the first calculated checksum from the client and the second checksum are compared.

25. The apparatus of claim 24, wherein the data is a media work.

26. The apparatus of claim 24, wherein the software code containing the algorithm contains a checksum calculation into which code of the client program and/or memory image of the client program is input.

27. The apparatus of claim 26, wherein the checksum calculation includes in its input a random number.

28. The apparatus of claim 24, wherein the software code containing the algorithm performs obfuscation task(s) on the client program.

29. The apparatus of claim 24, wherein the software code containing the algorithm is obfuscated.

30. A method of transmitting data to a client computer running a client program, the method comprising:

(a) encrypting the data using a sequence of different keys corresponding to respective temporally spaced segments of the data, (b) transmitting a temporally spaced segment of data to the client program, (c) transmitting software code containing a randomly generated algorithm from a security server to the client program, the algorithm having a result that is a function of a state of client program, (d) executing the software code at the client to provide a result of the algorithm, (e) determining whether the result is indicative of an unmodified client program, (f) in an event that the result is indicative of an unmodified client program, securely streaming a key corresponding to the transmitted segment from a secure remote server to the client program, and (g) decrypting the segment using the key.

31. A method as claimed in claim 30, further comprising repeating steps (b) and (f).

32. A method of transmitting a media work to a client computer running a client program, the method comprising:

(a) encrypting the media work using a sequence of different keys corresponding to respective temporally spaced segments of the media work, (b) transmitting software code having an associated trust interval and containing a randomly generated algorithm from a security server to the client program, the algorithm having a result that is a function of a state of the client program, (c) receiving the result from the software code at the client program, (d) determining whether the result is indicative of an unmodified client program, (e) transmitting a temporally spaced segment to the client program, (f) in an event that the result is indicative of an unmodified client program, securely streaming a key corresponding to the transmitted segment to the client program during the associated trust interval, and (g) decrypting the segment using the key.

33. An apparatus for delivering data to a client computer running a client program, comprising:

(a) a first hardware processor configured to execute software code;

(b) first software code, executed by the first hardware processor, configured to encrypt the data using a sequence of different keys corresponding to respective temporally spaced segments of the data and then transmit the temporally spaced segments of data to the client program;

(c) second software code, executed by the first hardware processor, configured to transmit third software code containing a randomly generated algorithm to the client program, the algorithm having a result that is a function of a state of the client program; and (d) fourth software code, executed by one of the first processor and a second hardware processor, configured to receive the result and determine whether the result is indicative of an unmodified client program;

(e) fifth software code, executed by one of the first hardware processor, the second hardware processor, and a third hardware processor, configured to securely stream a key corresponding to the transmitted segment to the client program in an event that the result is indicative of an unmodified client program, and (f) sixth software code, executed by one of the first hardware processor, the second hardware processor, the third hardware processor, and a fourth hardware processor, configured to decrypt the transmitted temporally spaced segment using the key.

* * * * *